US009524660B2

United States Patent
Lee et al.

(10) Patent No.: US 9,524,660 B2
(45) Date of Patent: Dec. 20, 2016

(54) DISPLAY APPARATUS

(71) Applicant: SAMSUNG ELECTRONICS CO., LTD., Suwon-si (KR)

(72) Inventors: Dong Yup Lee, Anseong-si (KR); Jae Hyung Kim, Gwangju-si (KR); Woo Sung In, Hwaseong-si (KR); Gyu Sung Do, Seoul (KR); Byung Joo Paek, Suwon-si (KR); Jeong Roh Lee, Hwaseong-si (KR); Jun Ho Yang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 14/289,008

(22) Filed: May 28, 2014

(65) Prior Publication Data

US 2014/0354519 A1 Dec. 4, 2014

(30) Foreign Application Priority Data

| May 28, 2013 | (KR) | 10-2013-0060235 |
| Jul. 16, 2013 | (KR) | 10-2013-0083453 |
| Jul. 29, 2013 | (KR) | 10-2013-0089398 |
| Dec. 23, 2013 | (KR) | 10-2013-0161466 |

(51) Int. Cl.
| *H05K 7/00* | (2006.01) |
| *H05K 5/00* | (2006.01) |
| *G09F 9/30* | (2006.01) |
| *G02F 1/1333* | (2006.01) |

(52) U.S. Cl.
CPC ......... *G09F 9/301* (2013.01); *G02F 1/133305* (2013.01)

(58) Field of Classification Search
CPC ..................................................... G06F 1/1626
USPC ..................................................... 361/679.21
See application file for complete search history.

(56) References Cited

U.S. PATENT DOCUMENTS

| 2,609,711 A * | 9/1952 | Wildhaber | B60K 17/165 475/231 |
| 2011/0095975 A1* | 4/2011 | Hwang | G06F 1/1626 345/156 |
| 2013/0155655 A1* | 6/2013 | Lee | H05K 5/03 362/97.1 |

FOREIGN PATENT DOCUMENTS

| JP | 2006023676 A | 1/2006 |
| JP | 2009109812 A | 5/2009 |
| KR | 10-2008-0018728 A | 2/2008 |
| KR | 20-2008-0006708 U | 12/2008 |
| KR | 10-2013-0050794 A | 5/2013 |

OTHER PUBLICATIONS

Communication, Issued by the International Searching Authority, Dated Aug. 22, 2014, in counterpart International Application No. PCT/KR2014/004708.

(Continued)

*Primary Examiner* — Jerry Wu

(74) *Attorney, Agent, or Firm* — Sughrue Mion, PLLC

(57) ABSTRACT

A display apparatus including a display module, and a drive device to deform the display module, is provided. The drive device switches the display module between a planar state and a curved state in which at least one lateral end of the display module protrudes forward. As such, the user may use the display module both in a planar state and a curved state.

5 Claims, 22 Drawing Sheets

(56) References Cited

OTHER PUBLICATIONS

Communication dated Jul. 29, 2016 issued by the European Patent Office in counterpart European Patent Application No. 14804186.6.

* cited by examiner

DISPLAY APPARATUS

CROSS-REFERENCE TO RELATED APPLICATIONS

This application claims the benefit of Korean Patent Applications No. 10-2013-0060235, filed on May 28, 2013, No. 10-2013-0089398, filed on Jul. 29, 2013, No. 10-2013-0083453, filed on Jul. 16, 2013, and No. 10-2013-0161466, filed on Dec. 23, 2013 in the Korean Intellectual Property Office, the disclosure of which is incorporated herein by reference.

BACKGROUND

1. Field

Apparatuses consistent with exemplary embodiments relate to a display apparatus having a display module that displays a screen.

2. Description of the Related Art

Generally, a display apparatus includes a display module that displays an image. Examples of display apparatuses include televisions or monitors. Among these display apparatuses, there is a display apparatus using a display module that includes an organic light emitting diode panel.

An organic light emitting diode panel is formed of a material that is deformable within a given range. Recently proposed is a display apparatus in which a display panel is mounted in a curved state, which allows a user to view a 3-dimensional image even when the viewer actually views a 2-dimensional image.

However, there may be some users who prefer a planar display module over a curved display module.

In addition, a curved display panel may effectively assist a viewer in being immersed in viewing when there is only one viewer, but may provide only a limited viewing angle when plural persons view the display panel.

Due to the fact that a conventional planar display panel may realize more accurate image transmission than the above-described curved display panel, there are some cases in which the conventional planar display panel may be more advantageous than the curved display panel according to the content being displayed.

SUMMARY

It is one aspect of the exemplary embodiments to provide a display apparatus which may selectively use a display module in a planar state or in a curved state.

It is another aspect of the exemplary embodiments to provide a display apparatus which may achieve accurate control of the curvature of a display module.

Additional aspects of the exemplary embodiments will be set forth in part in the description which follows and, in part, will be obvious from the description, or may be learned by practice of the invention.

In accordance with one aspect of the exemplary embodiments, a display apparatus includes a display module, and a drive device to deform the display module, wherein the drive device switches the display module between a planar state and a curved state in which at least one lateral end of the display module protrudes forward.

The display module may include a display panel displaying a screen, and a support frame to support the display panel, and the display panel and the support frame may be formed of deformable materials.

The display panel may include an organic light emitting diode panel.

The drive device may push the at least one lateral end of the display module forward such that the at least one lateral end of the display module protrude forward.

The drive device may include at least one motor to generate torque, a plurality of pinions to be rotated by the at least one motor, a pair of racks tooth-engaged with the pinions so as to be moved in opposite directions via rotation of the plurality of pinions, and a pair of rotating members each having one end rotatably fastened to a corresponding one of the racks and the other end rotatably fastened to one lateral end of the display module. The racks are operable to be moved simultaneously.

The display apparatus may further include a guide plate to which the drive device is installed, the guide plate movably supporting the racks.

The racks may include a first rack horizontally movably coupled to one side of the guide plate and a second rack horizontally movably coupled to another side of the guide plate, the first rack and the second rack being moved in opposite directions, the plurality of pinions may include a pair of first pinions tooth-engaged with the first rack, and a pair of second pinions tooth-engaged with the second rack, and the at least one motor may include at least two first motors to rotate the respective first pinions, and at least two second motors to rotate the respective second pinions.

In accordance with another aspect of the present invention, a display apparatus includes a display module, and a drive device to deform the display module to a planar state and a curved state, wherein the drive device includes a rotating unit rotatably provided at the rear of the display module to move at least one lateral end of the display module forward.

The rotating unit may include a rotating member rotatably provided at the rear of the display module, and a drive unit to rotate the rotating member.

The rotating member may include a rotating portion rotatably located at a center of the display module, and eccentric rotating portions extending respectively from both sides of the rotating portion so as to be eccentrically rotated relative to a rotation center.

The rotating member may include rounded bent portions connecting the rotating portion and the respective eccentric rotating portions to each other, the bent portions being moved forward during rotation of the rotating member to move both lateral ends of the display module forward.

The rotating member may take the form of a metal tube.

The drive unit may include a motor, a rack provided at a rear surface of the display module so as to be vertically moved by torque of the motor, and a pinion provided at an outer circumferential surface of the rotating portion so as to be engaged with and rotated by the rack.

The drive unit may further include a rotating gear connected to a shaft of the motor and a moving bracket tooth-engaged with the rotating gear to vertically move the rack.

The drive unit may further include a guide bracket to guide vertical movement of the rack at the rear surface of the display module.

In accordance with a further aspect of another exemplary embodiment, a display apparatus includes a display module, a frame provided at a rear of the display module, and a drive device provided at the frame to generate magnetic force required to move at least one lateral end of the display module forward relative to a center of the display module.

The drive device may include a first drive device disposed at a rear surface of the display module, a second drive device movably provided at the frame to generate the magnetic force in cooperation with the first drive device, and a moving unit to move the second drive device between a first position and a second position.

The second position may be a position where attractive force or repulsive force is generated between the first drive device and the second drive device.

The drive device may include a first fixing member to fix the first drive device to the rear surface of the display module.

The drive device may include a second fixing member to movably fix the second drive device to the frame.

The moving unit may include a moving bracket connected to the second fixing member, the moving bracket being horizontally movable at the rear of the frame, and a guide slot formed in the frame to guide movement of the moving bracket.

The moving unit may further include a drive unit to move the moving bracket.

The drive unit may include a motor and a connection bracket connecting the motor and the moving bracket to each other.

The first drive device may include N-poles and S-poles alternately arranged in a horizontal direction at the rear surface of the display module, and the second drive device may include S-poles and N-poles alternately arranged to correspond to the N-poles and S-poles of the first drive device.

The first drive device and the second drive device may generate greater magnetic force at both lateral ends thereof than that at respective center portions.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
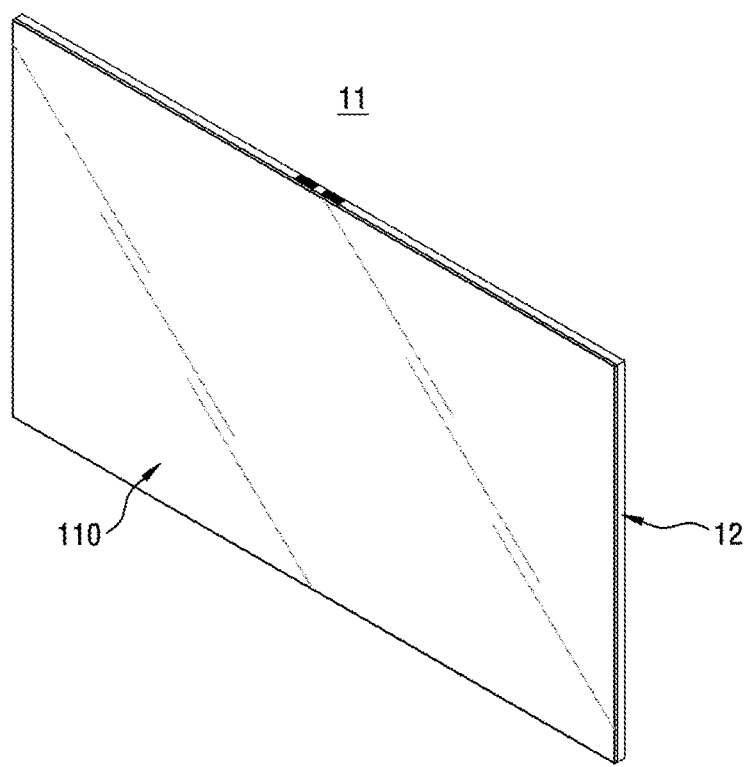
FIG. 1 is a perspective view showing a planar state of a display module in a display apparatus according to a first exemplary embodiment.

Reference will now be made in detail to exemplary embodiments, examples of which are illustrated in the accompanying drawings, wherein like reference numerals refer to like elements throughout.

Hereinafter, a display apparatus according to exemplary embodiments will be described with reference to the accompanying drawings.

Figure 2:
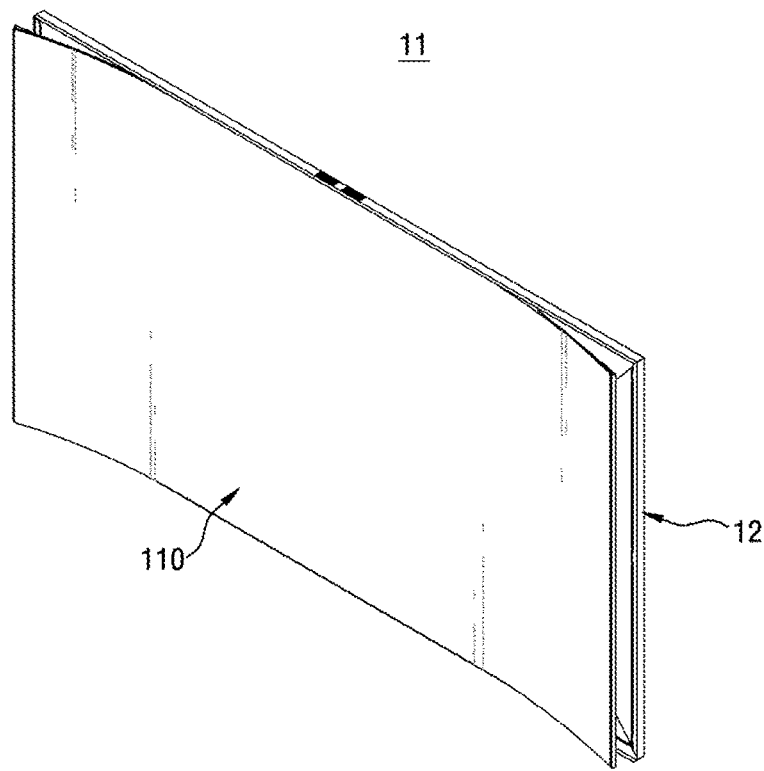
FIG. 2 is a perspective view showing a curved state of the display module in the display apparatus according to the first exemplary embodiment.

As exemplarily shown in FIGS. 1 and 2, the display apparatus 11 includes a display module 110 that displays an image. The display module 110, as exemplarily shown in FIG. 2, may be deformed such that both lateral ends thereof protrude forward.

Figure 3:
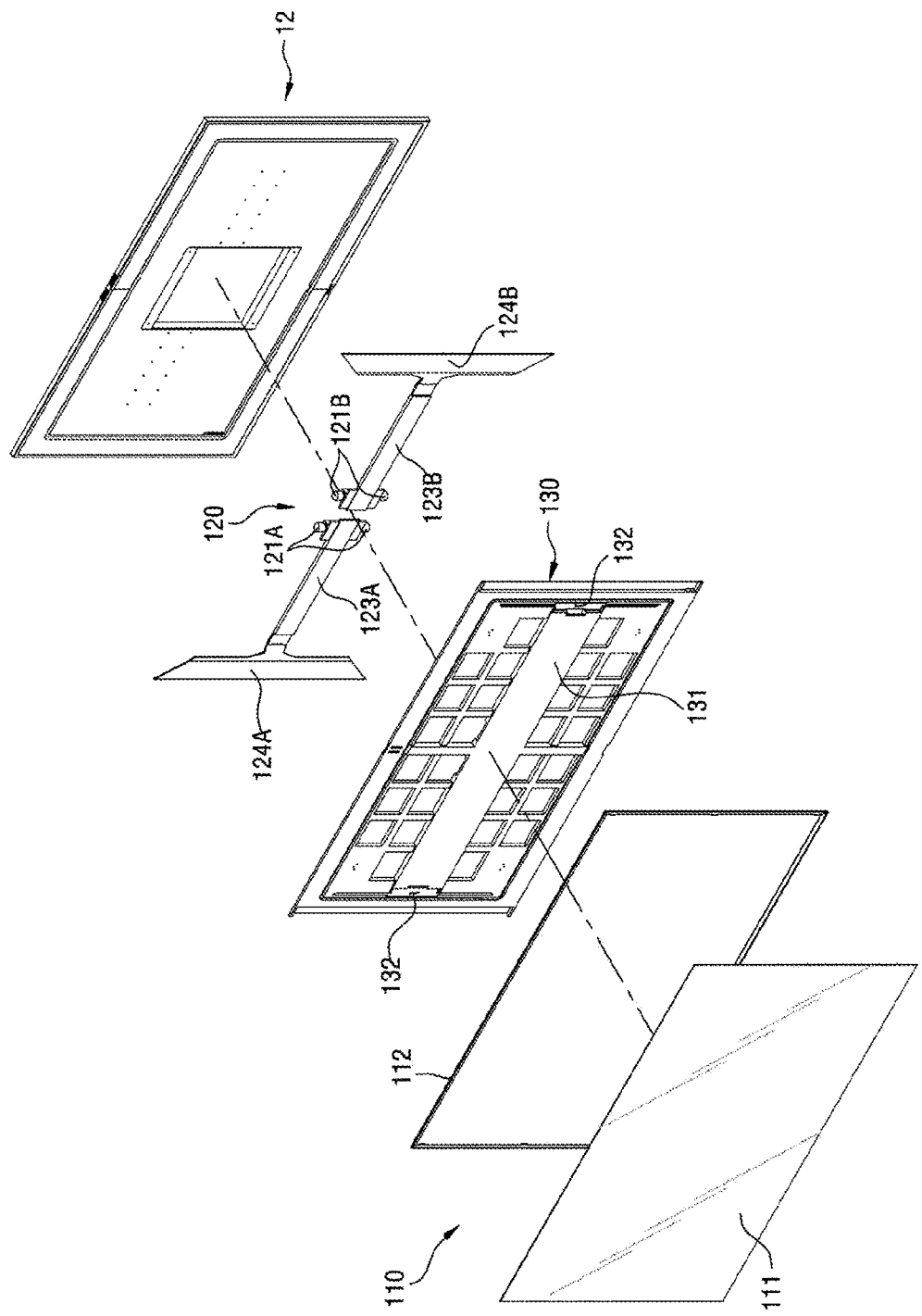
FIG. 3 is an exploded perspective view of the display apparatus according to the first exemplary embodiment.

The aforementioned display device 11, as exemplarily shown in FIG. 3, includes a drive device 120 placed at the rear of the display module 110, the drive device 120 serving to apply force to the display module 110 to deform the display module 110, a guide plate 130 to which the drive device 120 is installed, the guide plate 130 serving to guide the drive device 120 during operation of the drive device 120, and a case 12 configured to cover a rear surface of the guide plate 130.

The display module 110 includes a rectangular plate-shaped display panel 111 in the form of an organic light emitting diode panel, and a rectangular ring-shaped support frame 112 configured to support the rim of the display panel 111. In the present exemplary embodiment, the display panel 111 and the support frame 112 are respectively formed of deformable materials, so as to be deformed by the drive device 120.

The drive device 120 serves to deform the display module 110 in such a manner that the display module 110 is switched from a planar state to a curved state, in that both lateral ends of the display module 110 protrude forward, and vice versa. In this way, the drive device 120 realizes use of the display module 110 in a planar state or in a curved state.

Figure 4:
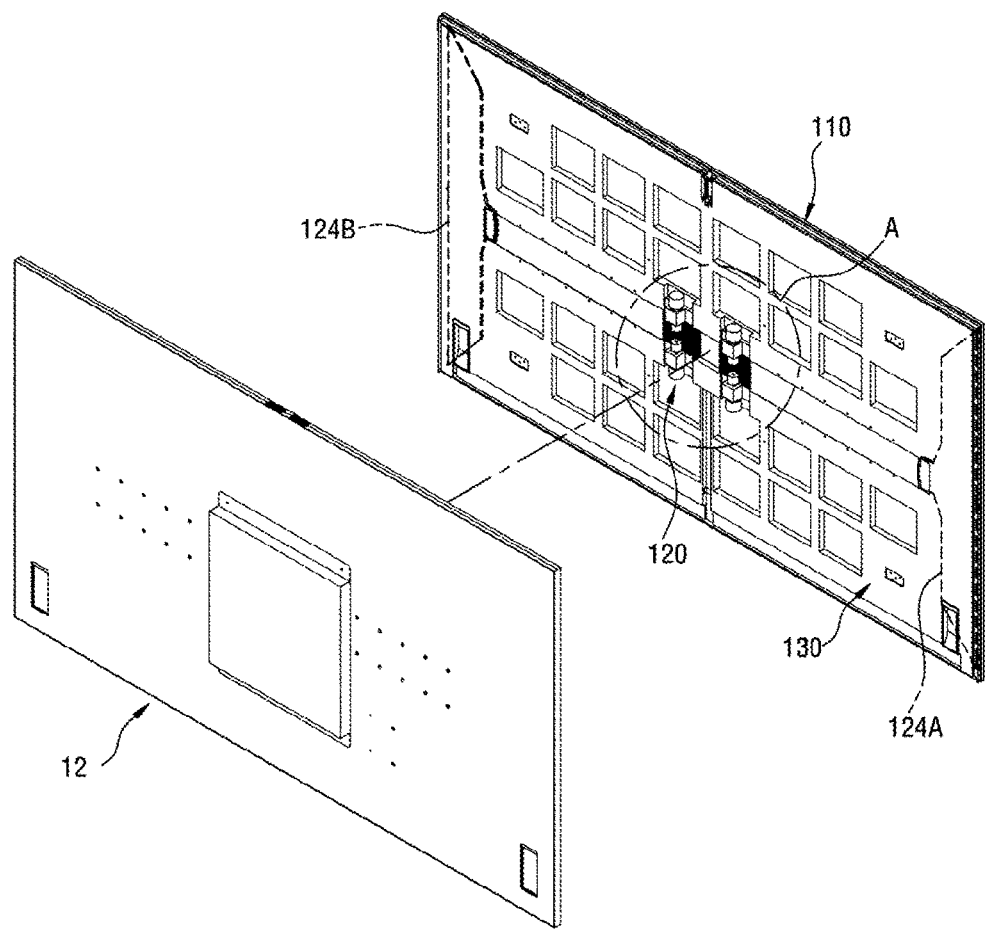
FIG. 4 is an exploded perspective view showing installation of a drive device in the display apparatus according to the first exemplary embodiment.
Figure 5:
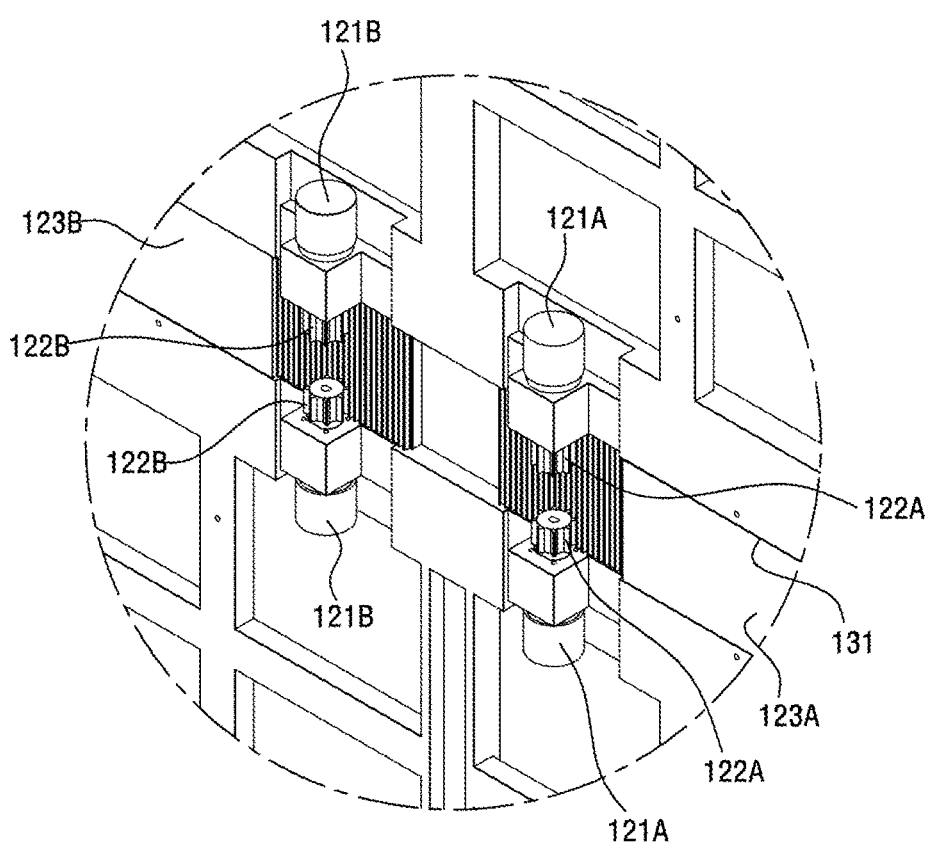
FIG. 5 is an enlarged view of portion A of FIG. 4.

In the present exemplary embodiment, the drive device 120, as exemplarily shown in FIGS. 3 to 5, includes a plurality of motors 121A, 121B to generate torque, a plurality of pinions 122A, 122B connected to the respective motors 121A, 121B so as to be rotated forward or in reverse by the respective motors 121A, 121B, a pair of racks 123A, 123B tooth-engaged with the respective pinions 122A, 122B so as to be horizontally reciprocated via rotation of the pinions 122A, 122B, and a pair of rotating members 124A, 124B each having one end rotatably fastened to a corresponding one of the racks 123A, 123B and the other end rotatably fastened to one lateral end of the support frame 112. The above-described drive device 120 is installed to the guide plate 130 located between the display module 110 and the case 12.

In the present exemplary embodiment, the racks 123A, 123B include a first rack 123A horizontally movably coupled to one side of the guide plate 130 and a second rack 123B horizontally movably coupled to the other side of the guide plate 130. The rotating members 124A, 124B include a first rotating member 124A both ends of which are connected to the first rack 123A and one end of the display module 110 respectively, and a second rotating member 124B, both ends of which are rotatably connected to the second rack 123B and the other end of the display module 110. In this case, the two rotating members 124A, 124B are forwardly tilted so as to be rotated forward following movement of the two racks 123A, 123B.

The motors 121A, 121B are adapted to simultaneously move the first rack 123A and the second rack 123B in opposite directions. The second rack 123B is moved rightward when the first rack 123A is moved leftward, and is moved leftward when the first rack 123A is moved rightward. Through this movement, both lateral ends of the display module 110 are simultaneously moved forward by the drive device 120 so as to be switched from a planar state to a curved state, and then are simultaneously returned rearward so as to be switched from the curved state to the planar state.

The motors include a pair of first motors 121A arranged at upper and lower positions at one side of the guide plate 130 and a pair of second motors 121B arranged at upper and lower positions at the other side of the guide plate 130. Correspondingly, the pinions include a pair of first pinions 122A installed to the respective first motors 121A and tooth-engaged with the first rack 123A, and a pair of second pinions 122B installed to the respective second motors 121B and tooth-engaged with the second rack 123B.

The guide plate 130 has a rectangular plate shape to correspond to the display module 110 and serves to support a rear surface of the display panel 111. The guide plate 130 has a central horizontally extending guide portion 131 to which the first rack 123A and the second rack 123B are movably installed. That is, the guide portion 131 serves to guide movement of the first rack 123A and the second rack 123B. The guide plate 130 further has through-holes 132 formed in both lateral sides thereof, through which the first rotating member 124A and the second rotating member 124B may penetrate the guide plate 130 and be connected to the support frame 112 of the display module 110.

Next, the display apparatus 11 having the above-described configuration will be described in detail with reference to the accompanying drawings.

Figure 6:
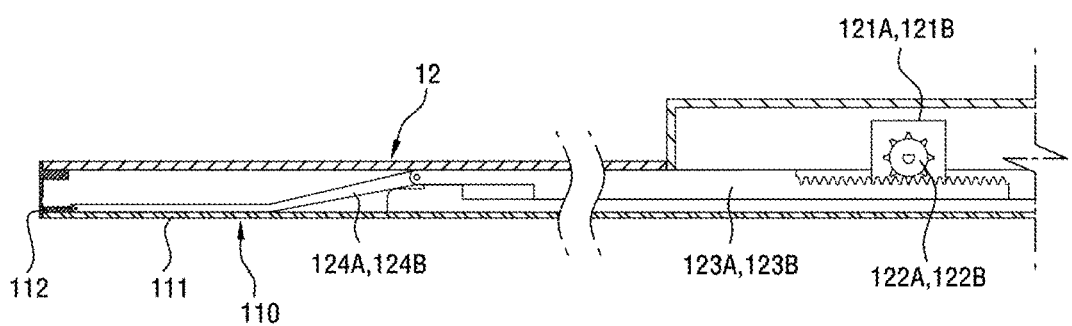
FIG. 6 is a sectional view showing the planar display module in the display apparatus according to the first exemplary embodiment.
Figure 7:
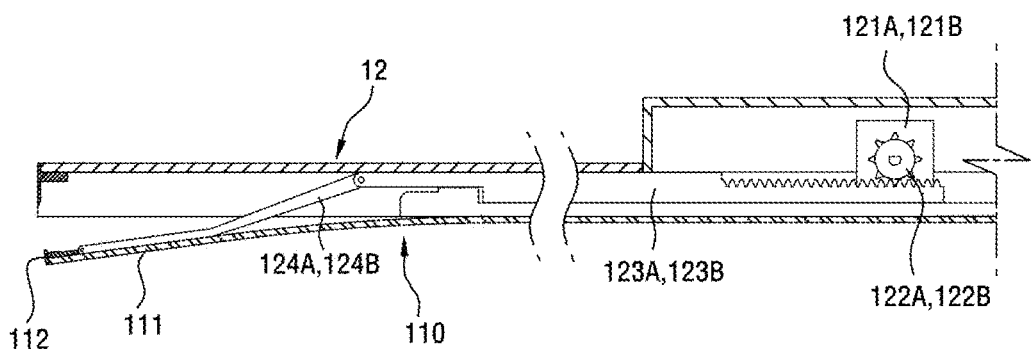
FIG. 7 is a sectional view showing the curved display module in the display apparatus according to the first exemplary embodiment.

First, when a user manipulates a switch or a remote controller to deform the display module 110, which is being used in a planar state as exemplarily shown in FIGS. 1 and 6, to a curved state, the motors 121A, 121B rotate the pinions 122A 122B in a given direction to move the first rack 123A and the second rack 12B in opposite lateral directions of the display apparatus 11 respectively as exemplarily shown in FIGS. 2 and 7. Through movement of the first rack 123A and the second rack 123B, the two rotating members 124A, 124B are rotated to forwardly push both lateral ends of the display module 110, thus causing the display module 110 to be deformed to a curved state such that both lateral ends of the display module 110 protrude forward relative to the center of the display module 110.

In such state, then, the user manipulates the switch or the remote controller to return the curved display module 110 to the planar state, the motors 121A, 121B rotate the pinions 122A, 122B in a direction opposite to the given direction to move the first rack 123A and the second rack 123B toward the center of the display apparatus 11. Through movement of the first rack 123A and the second rack 123B, the two rotating members 124A, 124B are rotated to rearwardly pull both lateral ends of the display module 110, thus causing the display module 110 to be returned to the planar state as exemplarily shown in FIGS. 1 and 6.

In the above description, the display module 110 of the display apparatus 11 becomes any one of a planar state and a curved state based on user manipulation, but is not limited thereto. Alternatively, based on the kind of content to be displayed on the display module 110, the display module 110 may be automatically switched from a planar state to a curved state and vice versa.

For example, when information indicating that content to be displayed on the display module 110 is news is input to the display apparatus 11, the display device 11 may cause the display module 110 to be in a planar state via operation of the drive device 120. When information indicating that content to be displayed on the display module 110 is a movie is input to the display apparatus 11, the display apparatus may cause the display module 110 to be in a curved state via operation of the drive device 120.

In the present exemplary embodiment, the drive device 120 has been described as including the motors 121A, 121B the pinions 122A 122B, the racks 123A, 123B, and the rotating members 124A, 124B, but this is given by way of example according to one exemplary embodiment; various other configurations of the drive device 120 may be possible so long as the drive device 120 deforms the display module 110 in such a manner that both lateral ends of the display module 110 protrude forward relative to the center of the display module 110.

In addition, although the drive device 120 has been described in the present exemplary embodiment as pushing both lateral ends of the display module 110 forward such that both lateral ends of the display module 110 protrude forward relative to the center of the display module 110, conversely, the drive device 120 may pull the center of the display module 110 rearward such that both lateral ends of the display module 110 protrude forward relative to the center of the display module 110.

Next, another exemplary embodiment will be described in detail with reference to the accompanying drawings.

Figure 8:
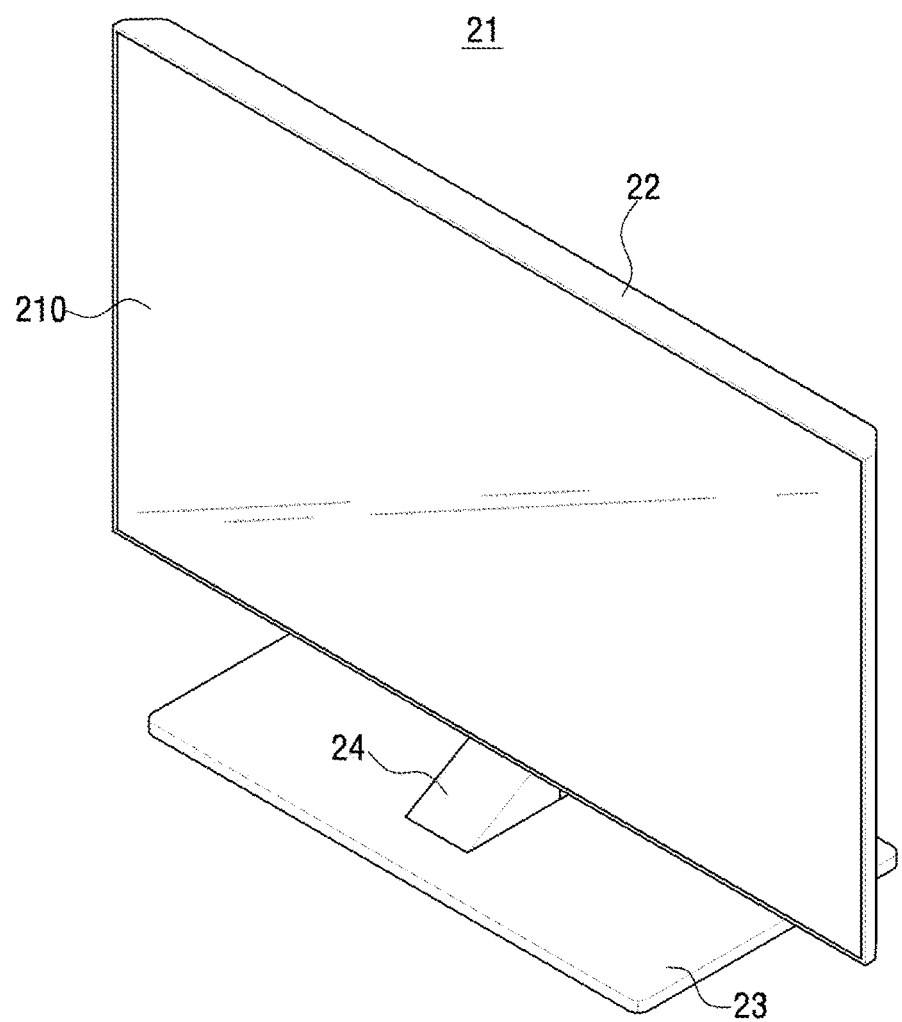
FIG. 8 is a perspective view schematically showing a display apparatus according to a second exemplary embodiment.
Figure 9:
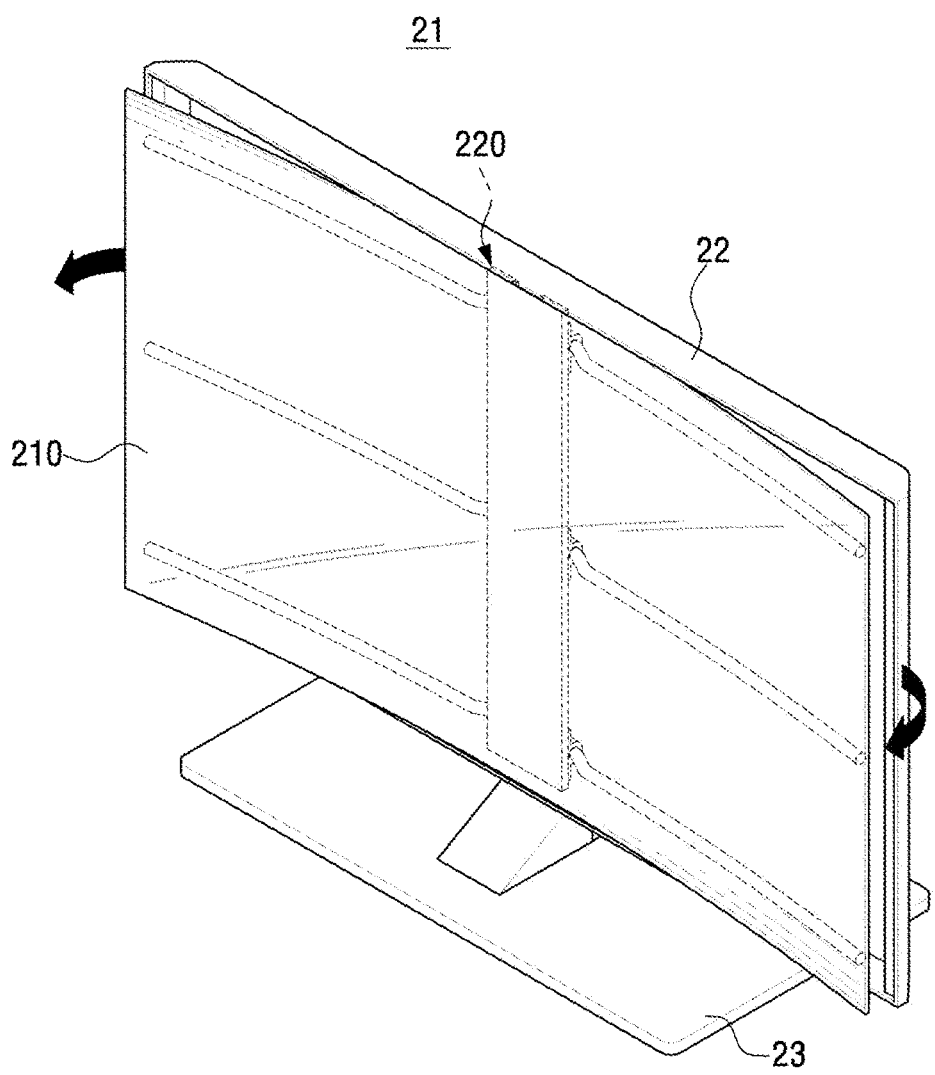
FIG. 9 is a perspective view schematically showing a curved state of a display module in the display apparatus according to the second exemplary embodiment.

FIG. 8 is a perspective view schematically showing a display apparatus according to a second exemplary embodiment, and FIG. 9 is a perspective view schematically showing a curved state of a display module in the display apparatus according to the second exemplary embodiment.

As exemplarily shown in FIGS. 8 and 9, the display apparatus 21 includes a display module 210 that displays image information, and a case 22 placed around the display module 210 to protect the display module 210 and internal electric elements.

The display module 210 may include a display panel that displays an image and a frame attached to the display panel. Considering a general display panel, a liquid crystal layer is interposed between two glass substrates, e.g., a thin film transistor (TFT) substrate and a color filter substrate, and a drive circuit arranged in a matrix operates respective pixels to emit light differently, achieving formation of an image on the entire display panel.

The case 22 may be configured to surround the rim of a front surface and an entire rear surface of the display module 210. The case 22 may accommodate, e.g., a power supply unit to provide power required to drive the display module 210, and a drive module to convert an electric signal transmitted from an external source into an image and sound.

A base 23 may be placed below the case 22 and supported on an installation plane for installation of the display apparatus 21, such as a floor, etc. The display module 210 and the base 23 may be connected to each other via a vertical stand 24.

The display apparatus 21 includes a drive device 220 to deform the display module 210 to a planar state and a curved state.

The drive device 220 is located between the display module 210 and the case 22, and serves to apply force to the display module 210 at the rear of the display module 210 such that both lateral ends of the display module 210 protrude forward relative to the center of the display module 210.

In the present exemplary embodiment, the display module 210 and the case 22 may be formed of deformable materials respectively so as to be deformed by the drive device 220.

As such, the drive device 220 may deform the display module 210 to selectively switch the display module 210 from a planar state to a curved state in which both lateral ends of the display module 210 protrude forward relative to the center of the display module 210, and vice versa.

Figure 10:
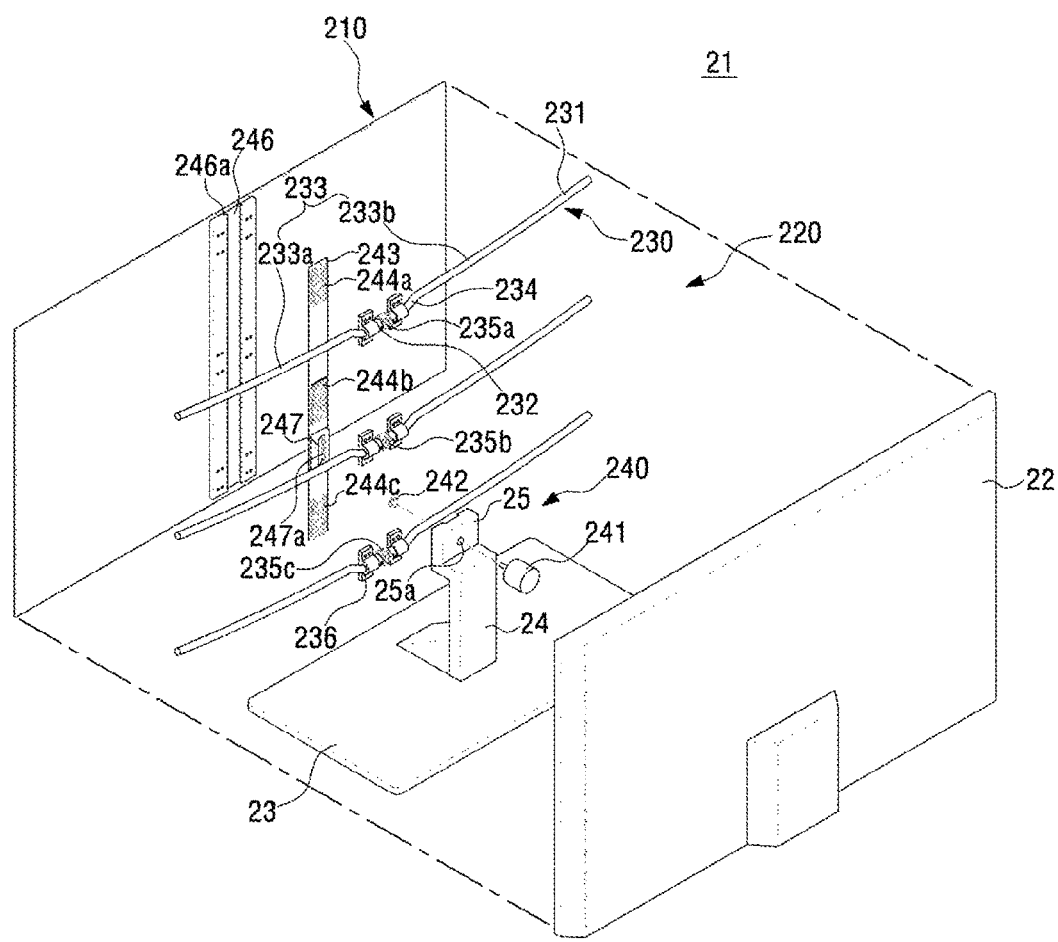
FIG. 10 is an exploded perspective view schematically showing a drive device in the display apparatus according to the second exemplary embodiment.
Figure 11:
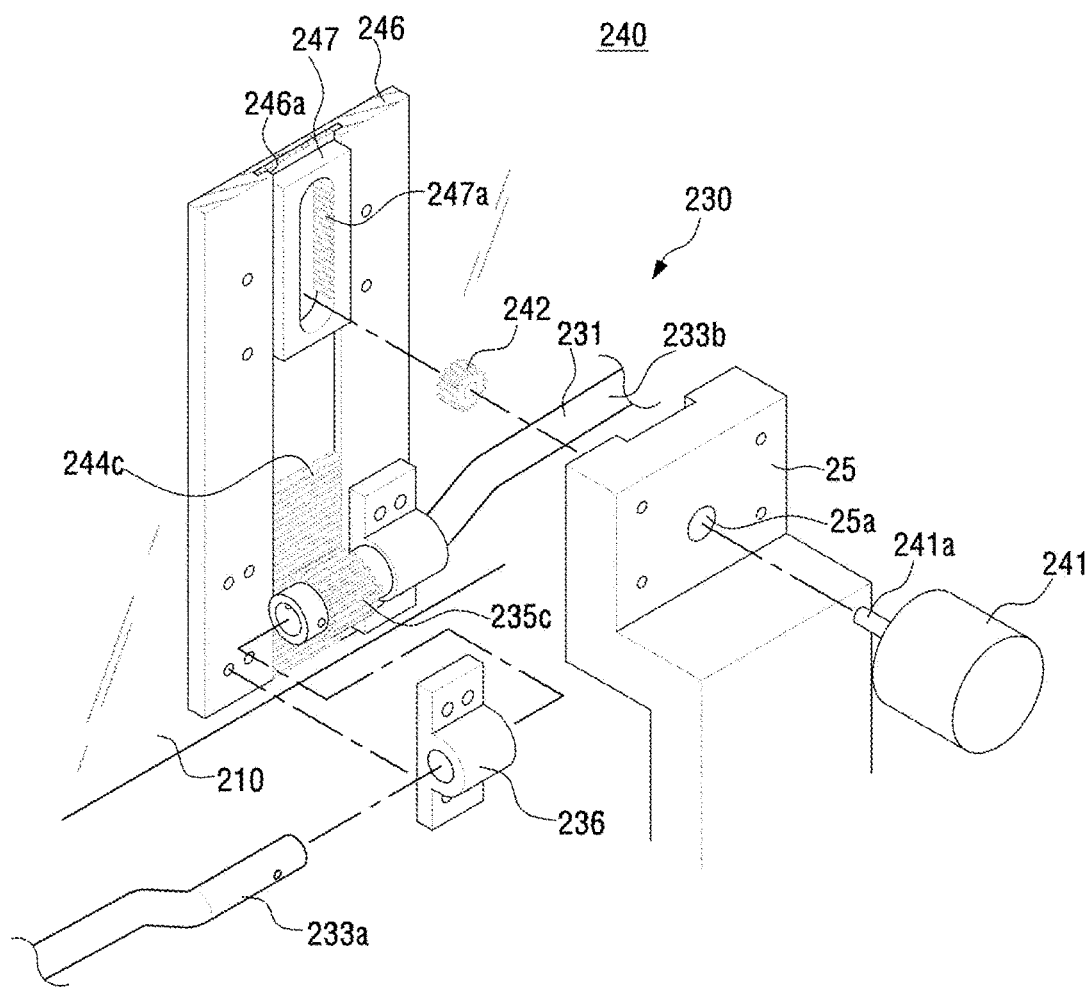
FIG. 11 is an exploded perspective view showing a drive unit of the drive device according to the second exemplary embodiment.

FIG. 10 is an exploded perspective view schematically showing the drive device of display apparatus according to the second exemplary embodiment, and FIG. 11 is an exploded perspective view showing a drive unit of the drive device according to the second exemplary embodiment.

As exemplarily shown in FIGS. 10 and 11 the drive device 220 may include a rotating unit 230 rotatably arranged at the rear of the display module 210 to move both lateral ends of the display module 210 forward.

The rotating unit 230 includes at least one rotating member 231 rotatably arranged at the rear of the display module 210, and a drive unit 240 to rotate the rotating member 231.

The rotating member 231 takes the form of a tube or a bar, for example. The tube may be made out of metal. Specifically, the rotating member 231 includes a rotating portion 232 rotatably located at the center of the display module 210, and eccentric rotating portions 233 extending respectively from both sides of the rotating portion 232 to be eccentrically rotated relative to the rotation center of the rotating portion 232.

The rotating member 231 may be horizontally arranged at the rear of the display module 210. Although the present exemplary embodiment shows three rotating members 231 arranged at the rear of the display module 210 by way of example, the disclosure is not limited thereto. For example, one or more rotating members 231 may be arranged.

Each rotating member 231 may include the center rotating portion 232 defining the rotation center of the rotating member 231, and the eccentric rotating portions 233 extending in opposite directions from the rotating portion 232.

The eccentric rotating portions 233 include a first eccentric rotating portion 233a extending from one side of the rotating portion 232, and a second eccentric rotating portion 233b extending from the other side of the rotating portion 232.

The first eccentric rotating portion 233a and the second eccentric rotating portion 233b are arranged to support both sides of a rear surface of the display module 210 respectively.

The eccentric rotating portions 233 may be connected to the rotating portion 232 via rounded bent portions 234 bent relative to the rotating portion 232. The bent portions 234 may be rotated forward by a maximum of approximately 90 degrees upon rotation of the rotating portion 232, and may support both sides of the rear surface of the display module 210 to allow the display module 210 to be moved forward and deformed.

As the display module 210 is adapted to protrude forward via rotation of the bent portions 234 of the rotating member 231 as described above, a curved state of the display module 210 may be adjusted by adjusting a rotation angle of the rotating member 231.

The drive unit 240 may include a motor 241 to generate torque to rotate the rotating member 231, a rack 243 configured to be vertically moved by torque of the motor 241, and at least one pinion 235 rotatably engaged with the rack 243.

The motor 241 of the drive unit 240 is mounted to a motor installation member 25 disposed on the base 23, and a motor installation hole 25a is perforated in a front-and-rear direction in the motor installation member 25.

The rack 243 is vertically installed to the center of the rear surface of the display module 210. The rack 243 includes a first gear 244a formed at an upper end thereof, a second gear 244b formed at the center thereof, and a third gear 244c formed at a lower end thereof.

The rack 243 is movably fitted into a guide groove 246a of a guide bracket 246 attached to the center of the rear surface of the display module 210.

The guide groove 246a extends in a vertical direction of the guide bracket 246, and the rack 243 may vertically slide along the guide groove 246a.

A moving bracket 247 may be mounted to the rack 243 to vertically move the rack 243 upon receiving torque of the motor 241. The moving bracket 247 may be located between the second gear 244b and the third gear 244c. The moving bracket 247 is provided at an inner surface thereof with a vertically extending moving gear 247a.

The moving gear 247a of the moving bracket 247 is engaged with a rotating gear 242 which is in turn connected to a rotating shaft 241a of the motor 241 passing through the motor installation hole 25a.

Accordingly, when the motor 241 is rotated, the moving bracket 247 is vertically moved as the moving gear 247a is engaged with the rotating gear 242 of the motor 241, and consequently the rack 243 connected to the moving bracket 247 is vertically moved.

The rotating member 231 is provided at an outer circumferential surface of the center rotating portion 232 with the pinion 235 provided to correspond to one of the first to third gears 244a, 244b, 244c of the rack 243.

Specifically, the at least one pinion 235 may include a first pinion 235a, a second pinion 235b, and a third pinion 235c provided at the respective rotating members 231 so as to correspond to the first to third gears 244a, 244b, 244c respectively.

Accordingly, when the first to third gears 244a, 244b, 244c are vertically moved via vertical movement of the rack 243, the first to third pinions 235a, 235b, 235c engaged with the first to third gears 244a, 244b, 244c are rotated, and consequently the respective rotating members 231 connected to the first to third pinions 235a, 235b, 235c are rotated.

Meanwhile, the rotating members 231 may be rotatably coupled to the guide bracket 246 using fixing members 236.

Figure 12:
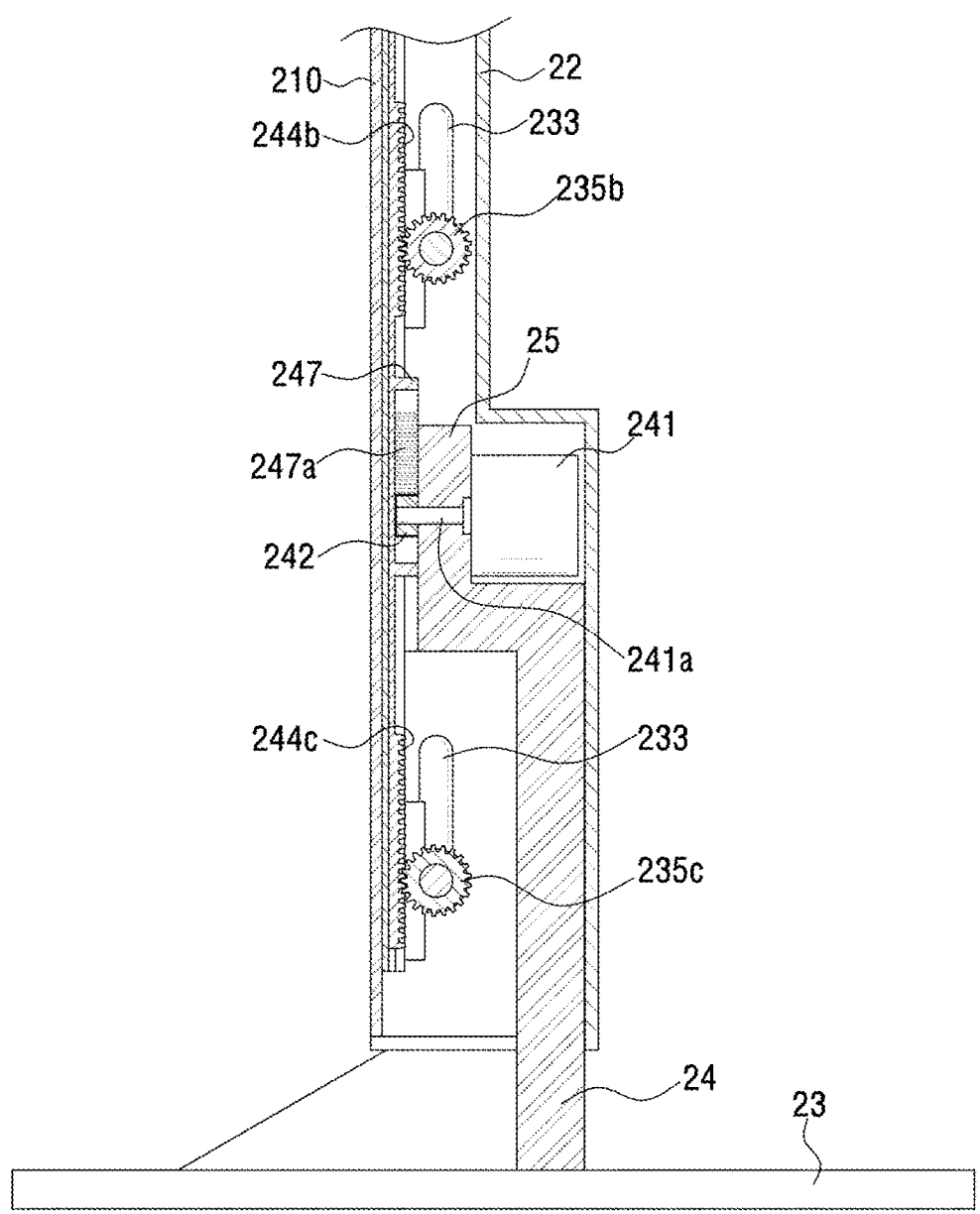
FIG. 12 is a view schematically showing a planar state of the display module before operation of the drive unit of the drive device according to the second exemplary embodiment.
Figure 13:
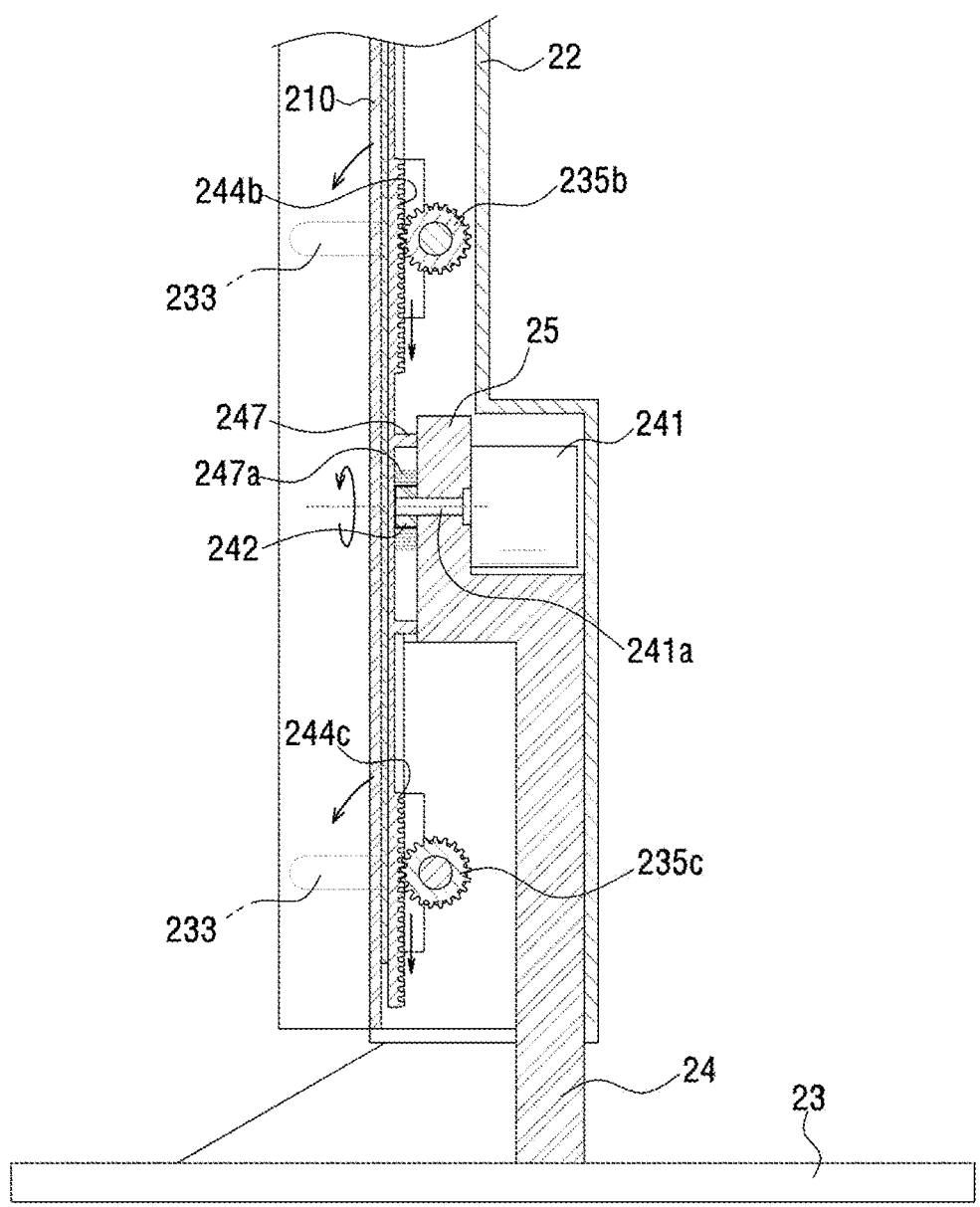
FIG. 13 is a view schematically showing a curved state of the display module after operation of the drive unit of the drive device according to the second exemplary embodiment.
Figure 14:
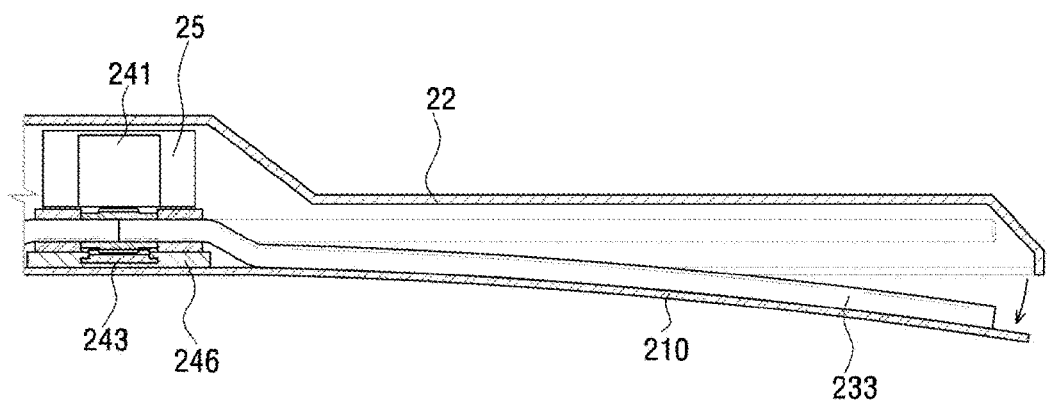
FIG. 14 is a view schematically showing motion of the display module caused by operation of the drive device according to the second exemplary embodiment.

FIG. 12 is a view schematically showing a planar state of the display module before operation of the drive unit of the drive device according to the second exemplary embodiment, FIG. 13 is a view schematically showing a curved state of the display module after operation of the drive unit of the drive device according to the second exemplary embodiment, and FIG. 14 is a view schematically showing motion of the display module caused by operation of the drive device according to the second exemplary embodiment.

As exemplarily shown in FIGS. 12 to 14, operation of the drive device 240 to selectively switch the display module 210 of the display apparatus 21 from a planar state to a curved state and vice versa will be described hereinafter.

When the user manipulates a switch (not shown) or a remote controller (not shown) to deform the display module 210, which is being used in a planar state, to a curved state, the motor 241 is rotated in a given direction, and simultaneously the rotating gear 242, which is connected to the rotating shaft 241a of the motor 241 and engaged with the moving gear 247a of the moving bracket 247, is rotated, causing the moving bracket 247 to move downward.

In this case, the rack 243 connected to the moving bracket 247 is moved downward along the guide groove 246a of the guide bracket 246 attached to the rear surface of the display module 210, and simultaneously the first gear 244a, the second gear 244b, and the third gear 244c formed at the rack 243 are moved downward.

Through movement of the rack 243, the first pinion 235a, the second pinion 235b, and the third pinion 235c engaged respectively with the first gear 244a, the second gear 244b, and the third gear 244c are rotated, thus causing the rotating portions 232 of the respective rotating members 231 provided with the first to third pinions 235a, 235b, 235c are rotated.

In this case, the rotating portion 232 of each rotating member 231 is rotated forward of the display module 210, and consequently the bent portions 234 connected to both sides of the rotating portion 232 and the eccentric rotating portions 233 extending from the respective bent portions 234 are rotated forward, whereby the rotating member 231 may move both lateral ends of the rear surface of the display module 210 forward, thus allowing the display module 210 to be deformed to a curved state.

In this case, a rotation angle of the rotating member 231 is adjustable via control of the motor 241. Adjustment of the rotation angle of the rotating member 231 enables precise adjustment of a curved state of the display module 210, thus achieving improvement in terms of a viewing angle.

Then, in such a state, when the user manipulates the switch or the remote controller to deform the display module 210 to a planar state, the motor 241 is rotated in a direction opposite to the given direction, and the rotating gear 242 connected to the rotating shaft 241a of the motor 241 moves the moving bracket 247 upward.

The rack 243 connected to the moving bracket 247 is moved upward to an original position thereof, and the first to third pinions 235a, 235b, 235c connected to the first to third gears 244a, 244b, 244c of the rack 243 are rotated to return the bent portions 234 and the eccentric rotating portions 233 of the rotating members 231 to original positions thereof.

As the bent portions 234 and the eccentric rotating portions 233 of the rotating members 231 are returned to original positions thereof, force is no longer applied to the rear surface of the display module 210, thus causing the display module 210 to be returned to a planar state.

Hereinafter, still another exemplary embodiment will be described in detail with reference to the accompanying drawings.

Figure 15:
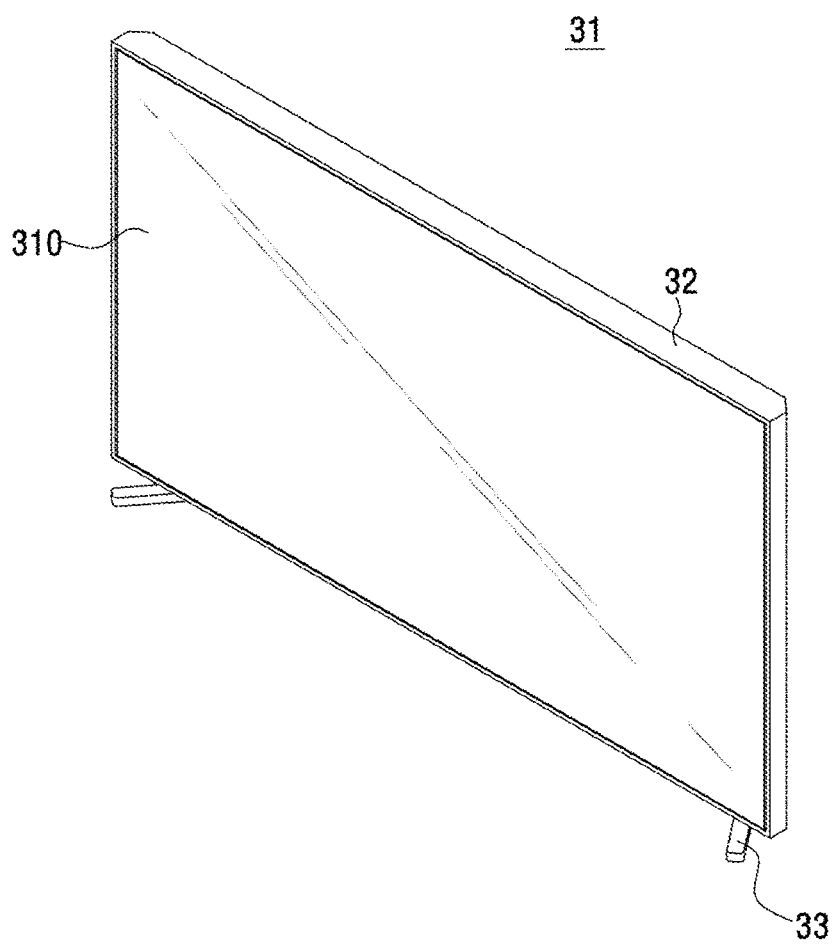
FIG. 15 is a perspective view schematically showing a display apparatus according to a third exemplary embodiment.
Figure 16:
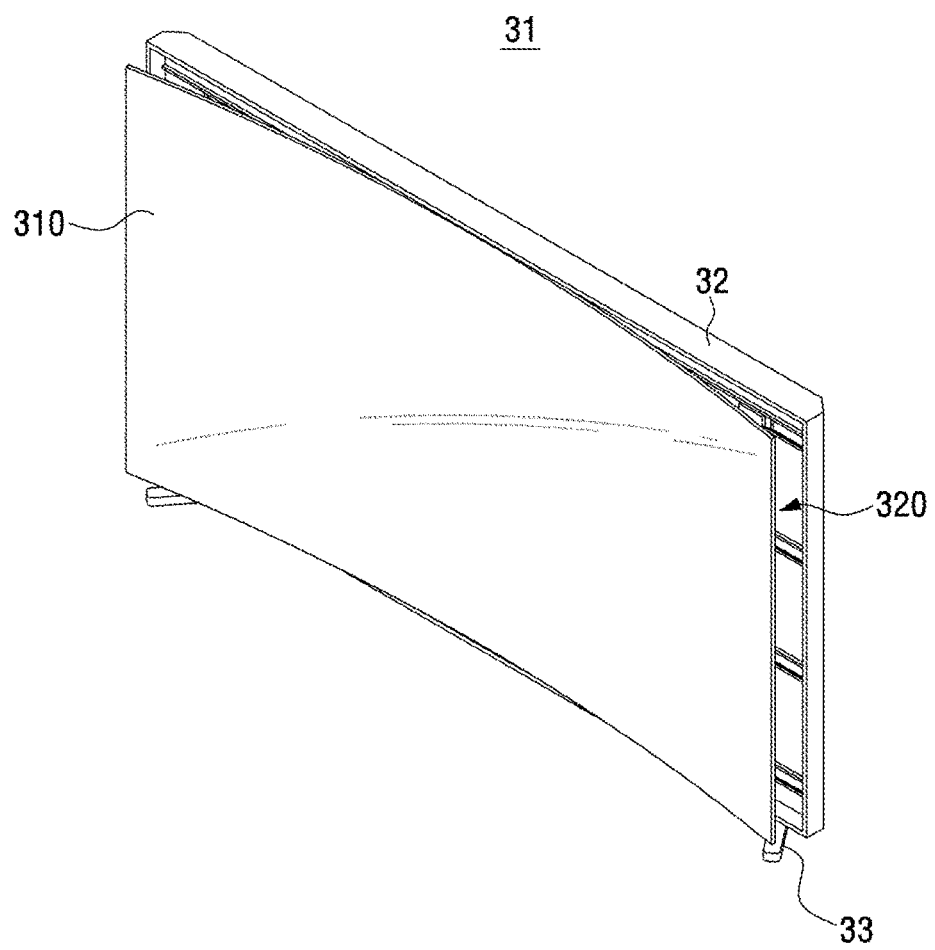
FIG. 16 is a perspective view schematically showing a curved state of a display module in the display apparatus according to the third exemplary embodiment.

FIG. 15 is a perspective view schematically showing a display apparatus according to a third exemplary embodiment, and FIG. 16 is a perspective view schematically showing a curved state of a display module in the display apparatus according to the third exemplary embodiment.

As exemplarily shown in FIGS. 15 and 16, the display apparatus 31 includes a display module 310 that displays image information, and a case 32 placed around the display module 310 to protect the display module 310 and internal electric elements.

The display module 310 may include a display panel that displays an image and a frame 323 attached to the display panel. Considering a general display panel, a liquid crystal layer is interposed between two glass substrates, e.g., a thin film transistor (TFT) substrate and a color filter substrate, and a drive circuit arranged in a matrix operates respective pixels to emit light differently, achieving formation of an image on the entire display panel.

The case 32 may be configured to surround the rim of a front surface and an entire rear surface of the display module 310. The case 32 may accommodate, e.g., a power supply unit to provide power required to drive the display module 310, and a drive module to convert an electric signal transmitted from an external source into an image and sound.

The display apparatus 31 includes a drive device 320 to deform the display module 310 to a planar state and a curved state.

In the present exemplary embodiment, the drive device 320 generates magnetic force between the display module 310 and the case 32, and the display module 310 and the case 32 are formed of deformable materials respectively to be deformed by a magnetic force generated by the drive device 320.

Figure 17:
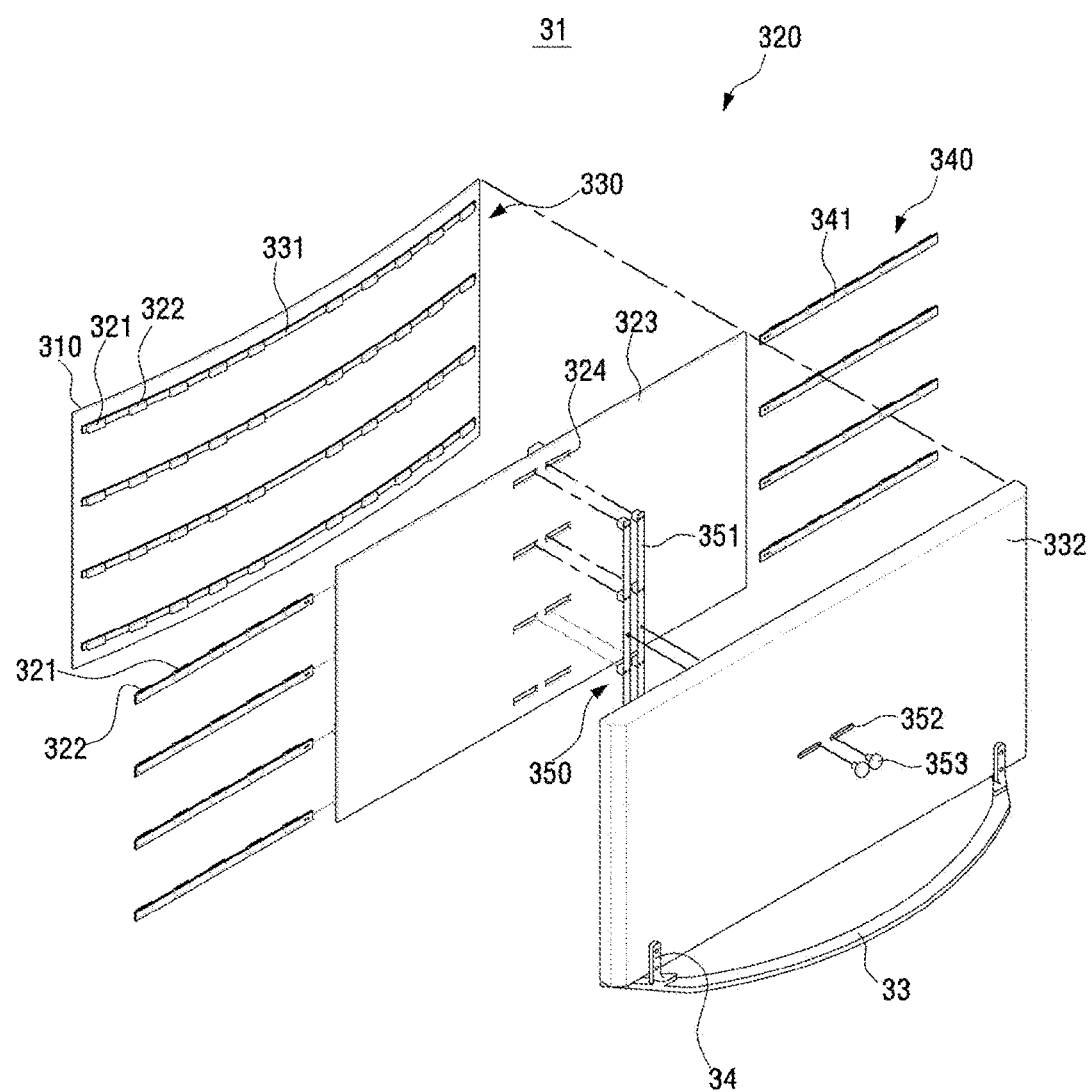
FIG. 17 is an exploded perspective view schematically showing a drive device in the display apparatus according to the third exemplary embodiment.
Figure 18:
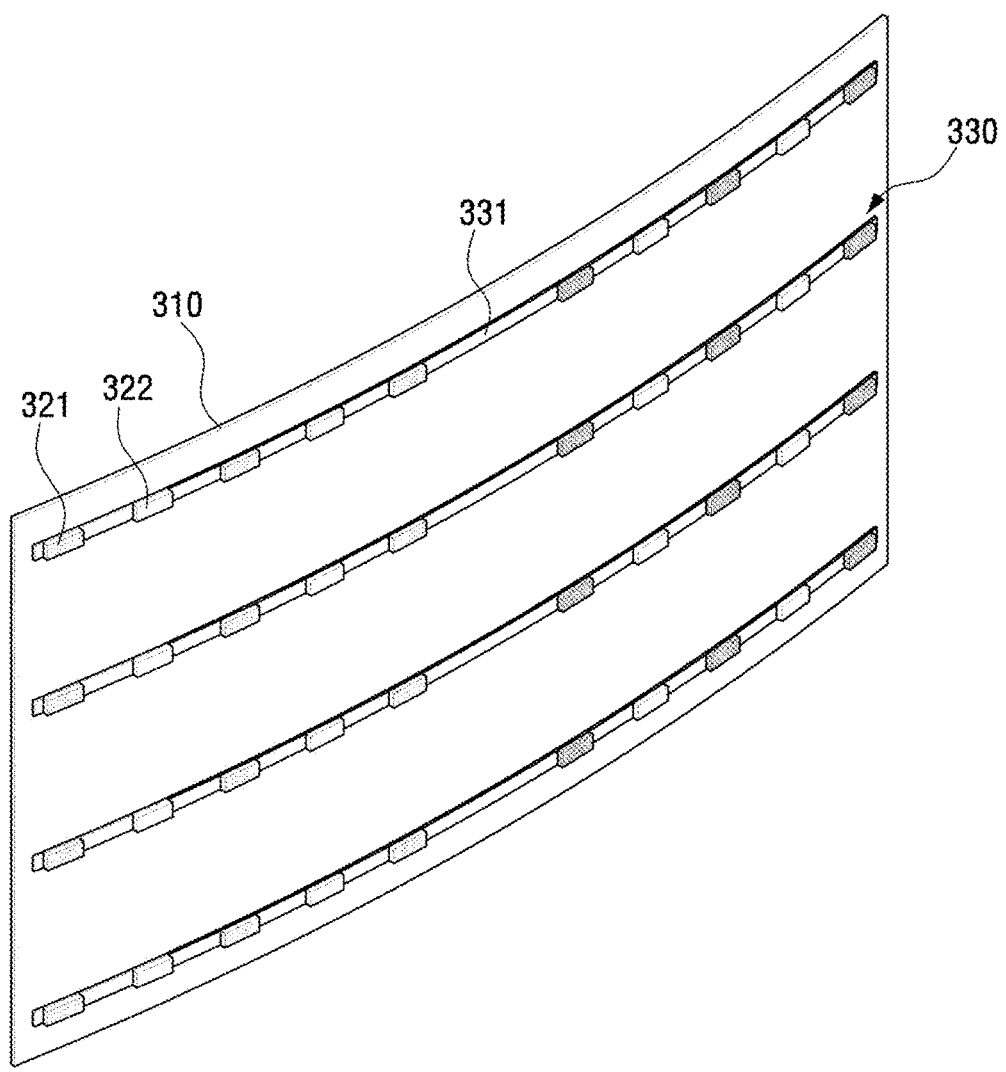
FIG. 18 is a view schematically showing the drive device according to the third exemplary embodiment.
Figure 19:
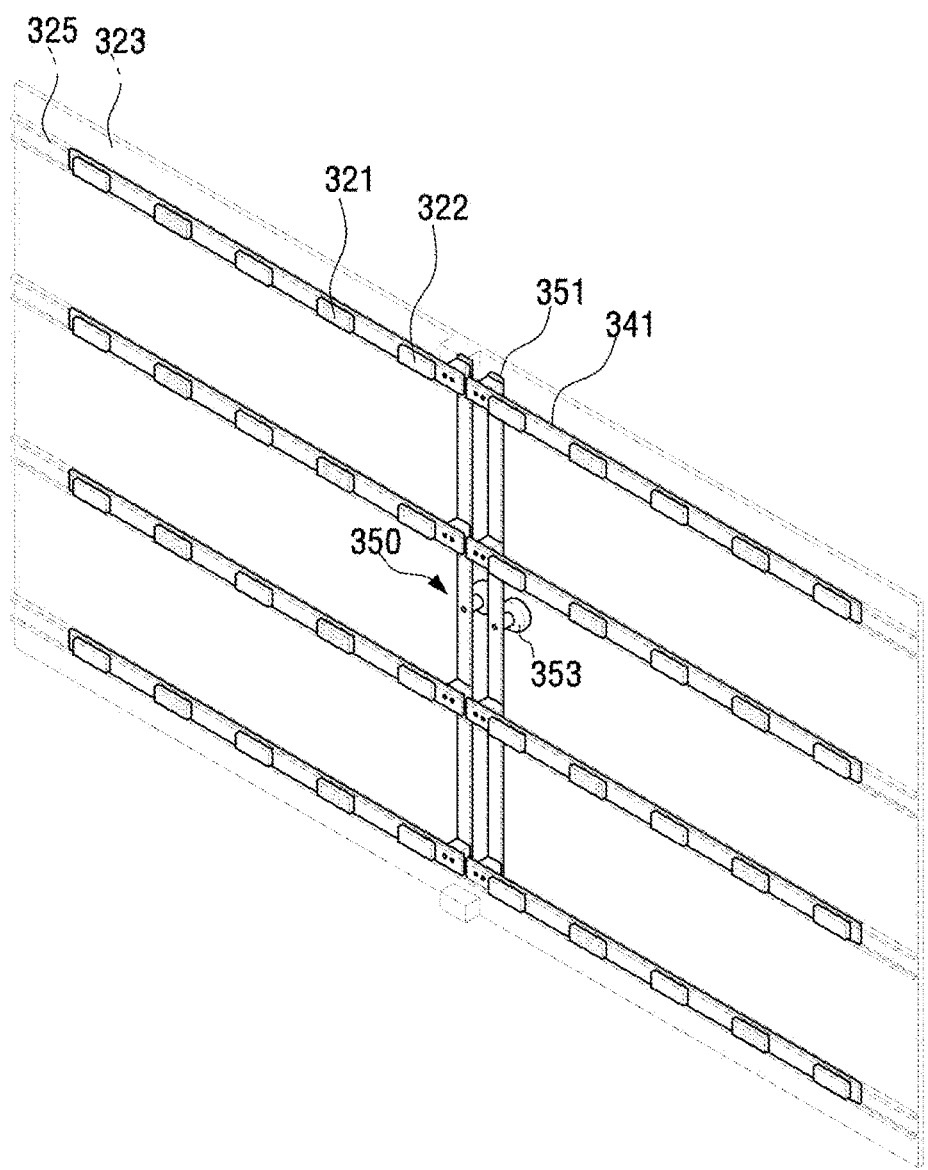
FIG. 19 is a view schematically showing a moving unit of the drive device according to the third exemplary embodiment.
Figure 20:
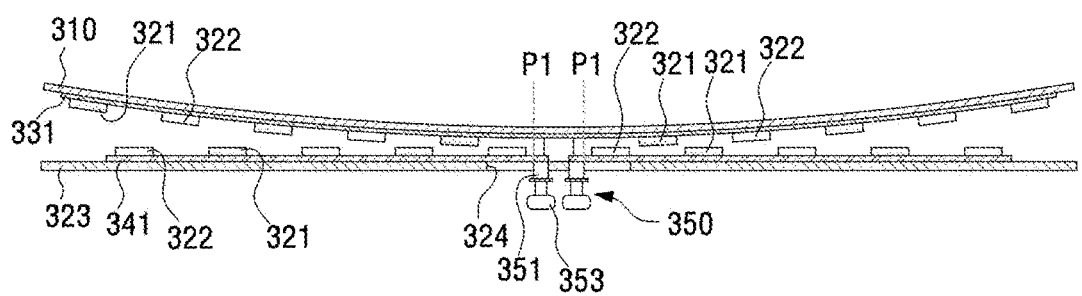
FIGS. 20 and 21 are views schematically showing motion of a display module caused by operation of the drive device according to the third exemplary embodiment.
Figure 21:
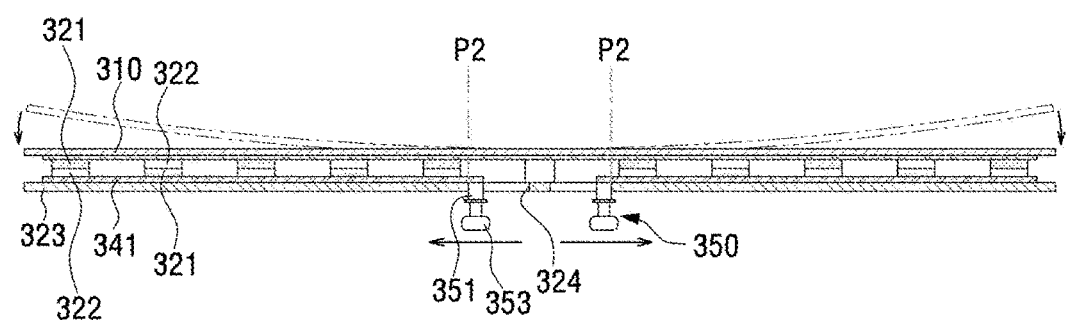

FIG. 17 is an exploded perspective view schematically showing the drive device of the display apparatus according to the third exemplary embodiment, FIG. 18 is a view schematically showing the drive device according to the third exemplary embodiment, FIG. 19 is a view schematically showing a moving unit of the drive device according to the third exemplary embodiment, and FIGS. 20 and 21 are views schematically showing motion of the display module caused by operation of the drive device according to the third exemplary embodiment.

As exemplarily shown in FIGS. 17 to 21, the display apparatus 31 includes the drive device 320 to generate magnetic force in a space between the drive device 320 and the display module 310 to deform the display module 310 to a planar state and a curved state.

The drive device 320 is located between the display module 310 and the case 32 and applies magnetic force to the display module 310 at the rear of the display module 310 to allow both lateral ends of the display module 310 to protrude forward relative to the center of the display module 310.

Specifically, the drive device 320 is located between the display module 310 and the case 32 to deform the display module 310 such that the display module 310 is selectively switched between a planar state and a curved state in which both lateral ends of the display module 310 protrude forward relative to the center of the display module 310.

A base 33 may be placed below the case 32 and supported on an installation plane for installation of the display apparatus 31, such as a floor, etc. The display module 310 and the base 33 may be connected to each other via a vertical stand 34 disposed on the base 33.

In this case, to stably support left and right ends of the display module 310, a pair of stands 34 may be positioned respectively at both lateral ends of the base 33.

The drive device 320 is adapted to generate magnetic force required to move both lateral ends of the display module 310 forward and rearward.

The drive device 320 may include a first drive device 330 disposed at a rear surface of the display module 310, a second drive device 340 horizontally movably disposed at a front surface of the frame 323 to generate magnetic force in cooperation with the first drive device 330, and a moving unit 350 to move the second drive device 340 between a first position P1 and a second position P2.

The drive device 320 may include at least one first fixing member 331 to fix the first drive device 330 to the rear surface of the display module 310.

The first fixing member 331 may be horizontally installed to the rear surface of the display module 310. Although the present exemplary embodiment illustrates four first fixing members 331 as being equidistantly arranged at upper and lower end positions and two intermediate positions of the display module 310, the disclosure is not limited thereto. For example, five or more first fixing members 331 may be provided.

The first fixing member 331 may include N-pole magnets 321 and S-pole magnets 322 arranged alternately, and the N-pole magnets 321 and the S-pole magnets 322 may be equidistantly spaced apart from one another.

The frame 323, to which the drive device 320 and the moving unit 350 are installed, is located between the display module 310 and the case 320.

The second drive device 340 is disposed on the front surface of the frame 323, and S-pole magnets 322 and N-pole magnets 321 are alternately attached to at least one second fixing member 341 movably installed to the frame 323.

In this case, to enable generation of interactive magnetic attraction between the first drive device 330 and the second drive device 340, the magnets having opposite polarities may be arranged to correspond to each other. For example, assuming that the first drive device 330 has the sequence of the N-pole magnet 321 and the S-pole magnet 322, the second drive device 340 may have the sequence of the S-pole magnet 322 and the N-pole magnet 321. Although the present exemplary embodiment illustrates the first drive device 330 as having the sequence of the N-pole magnet 321 and the S-pole magnet 322 by way of example, the disclosure is not limited thereto.

The frame 323 is provided with at least one horizontally extending guide 325 to guide horizontal movement of the second drive device 340.

In addition, the frame 323 is centrally provided with guide slots 324 for installation of the moving unit 350 used to move the second drive device 340.

Specifically, four guide slots 324 may be horizontally formed in upper and lower end positions and two intermediate positions of the frame 323 to correspond to the second drive device 340.

The moving unit 350 may include a pair of moving brackets 351 connected to the second fixing member 341. The moving brackets 351 are connected to the second fixing member 341 through the guide slots 324 of the frame 323.

The second fixing member 341 and each moving bracket 351 may be connected to each other via fastening members, such as bolts, or may be integrated with each other.

The moving unit 350 may further include a pair of grip pieces 353 providing outward from the case 32. The grip pieces 353 are connected to the respective moving brackets 351 to allow the user to horizontally move the second drive device 340 and the moving unit 350 by moving the grip pieces 353 when the user wishes to adjust the state of the display module 310.

In this case, guide grooves 352 to guide movement of the grip pieces 353 are formed in the center of the case 32. The guide grooves 352 may be positioned to correspond to the guide slots 324 formed at the intermediate position of the frame 323.

Hereinafter, operation of the drive device 320 of the display apparatus 31 to selectively deform the display module 310 to a planar state and a curved state will be described with reference to FIGS. 20 and 21.

First, it is assumed that the display module 310 is normally used in a curved state.

In this case, the first drive device 330 disposed on the rear surface of the display module 310 and the second drive device 340 provided at the frame 323 inside the case 32 deviate from each other. For example, the second drive device 340 is located at a first position P1 spaced apart from the first drive device 330 by a prescribed distance, and no magnetic interaction is generated between the first drive device 330 and the second drive device 340.

When the user moves the grip pieces 353 provided at the rear surface of the case 32 leftward and rightward along the guide grooves 352 to deform the curved display module 310 to a planar state, the second drive device 340 is shifted to the second position P2 where magnetic attraction between the first drive device 330 and the second drive device 340 is generated.

Thereby, the display module 310 connected to the first drive device 330 is moved toward the frame 323 connected to the second drive device 340 via magnetic attraction between the first drive device 330 and the second drive device 340, thus being deformed to a planar state.

Figure 22:
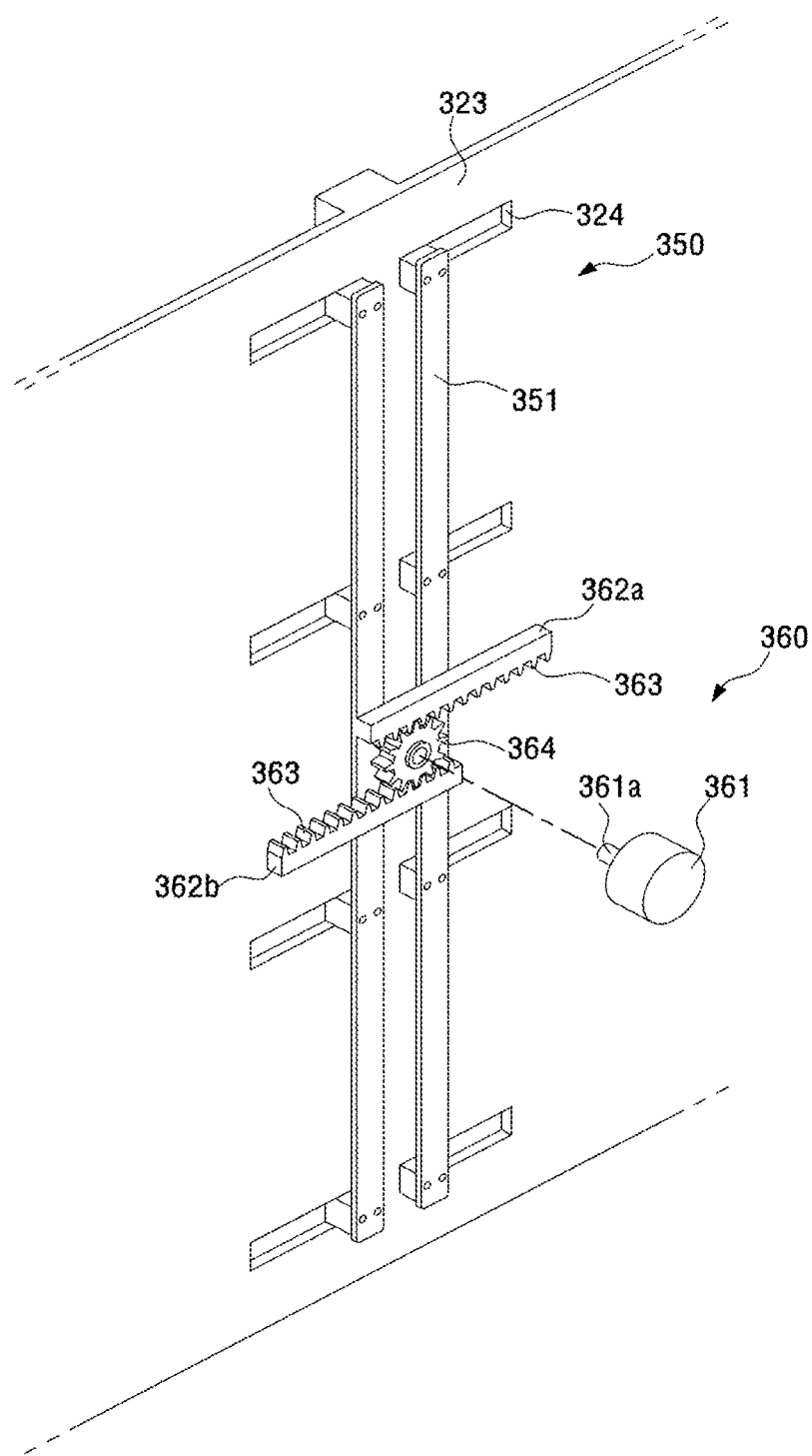
FIG. 22 is a view schematically showing a moving unit of a drive device according to a fourth exemplary embodiment.

FIG. 22 is a view schematically showing the moving unit of the drive device according to a fourth exemplary embodiment.

As exemplarily shown in FIG. 22, the moving unit 350 to move the display module 310 may include a drive unit 360.

The drive unit 360 includes a motor 361, and a connection bracket (not shown) connecting the motor 361 and the moving brackets 351 to each other.

The connection bracket includes a first connection bracket 362a and a second connection bracket 362b connected respectively to the left and right moving brackets 351.

Gears 363 are formed at a lower surface of the first connection bracket 362a and at an upper surface of the second connection bracket 362b.

A circular rotating shaft gear 364 connected to a rotating shaft 361a of the motor 361 is located between the first connection bracket 362a and the second connection bracket 362b so as to be engaged with the gears 363 of the first and second connection brackets 362a, 362b.

Accordingly, when the motor 361 is rotated, the first connection bracket 362a and the second connection bracket 362b are moved leftward and rightward respectively by the rotating shaft gear 364 connected to the rotating shaft 361a of the motor 361.

The moving brackets 351 are moved leftward or rightward via movement of the first connection bracket 362a and the second connection bracket 362b, thereby moving the second drive device 340.

Switching between a planar state and a curved state of the display module 310 caused by movement of the second drive device 340 is identical to the above description, and thus a detailed description thereof will be omitted hereinafter.

In addition, although not shown in the drawings, the above-described display apparatus 11/21/31 may include printed circuit boards including a power source board connected to an external power source to supply power to the display apparatus 11/21/31, a signal processing board to process various image and sound signals, a panel drive board to control the display panel, and a timing control board to transmit image signals to the display panel. These printed circuit boards may be installed to the case of the display apparatus 11/21/31 or a control box separate from the display apparatus 11/21/31.

The display apparatus 11/21/31 of the above-described embodiments may include a controller (not shown) to control the drive device 120/220/320, and a remote controller (not shown) or buttons (not shown) provided at the display apparatus 11/21/31, to deform the display module 110/210/310 to any one of a planar state or a curved state based on button manipulation.

Alternatively, the display modules 110, 210, and 310 may be automatically deformed to a planar state or a curved state by the drive device 120, 220, and 320 based on the kind of content to be displayed on the display modules 110, 210, and 310.

For example, when information indicating that content to be displayed on the display modules 110/210/310 is news is input to the display apparatuses 11/21/31, the display modules 110/210/310 may be deformed to a planar state by the drive devices 120/220/320. When information indicating that content to be displayed on the display modules 110/210/310 is a movie is input to the display apparatuses 11/21/31, the display modules 110/210/310 may be deformed to a curved state by the drive devices 120/220/320.

In this case, information regarding the kind of content may be input as the user manipulates buttons, or may be transmitted, along with image signals, from an image transmitter, such as a broadcasting station.

Although the display module 110/210/310 of the above-described exemplary embodiments are deformed to any one of a planar state and a curved state having a given curvature, the disclosure is not limited thereto. The display module 110/210/310 may be continuously deformed within a given curvature range based on user selection, or may be deformed in multiple stages. That is, when the user pushes a button, the curvature of the display module 110/210/310 may continuously vary in proportion to a push time, or may vary in multiple stages in proportion to the number of times the button is pushed.

In addition, although the entire display module has been described as being deformed by a given curvature in the above-described exemplary embodiments, the disclosure is not limited thereto. According to design specifications, only a center portion of the display module may be deformed to a curved state while lateral ends of the display module remain in a planar state, or the center and lateral ends of the display module may be deformed by different curvatures.

In addition, although the above exemplary embodiments describe the display apparatus using the organic light emitting diode panel by way of example, the disclosure is not limited thereto. A large liquid crystal panel may be bendable at both sides thereof, and therefore the above-described drive devices may be directly applied even to display apparatuses using a liquid crystal panel.

As is apparent from the above description, a display module of a display apparatus may be deformed via operation of a drive device so as to be selectively used in a planar state or in a curved state.

Further, the user may switch the display module from a planar state to a curved state and vice versa based on the kind of content to be displayed on the display module.

Although the exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A display apparatus comprising: a display module; and a drive device to deform the display module, wherein the drive device switches the display module between a planar state and a curved state in which at least one lateral end of the display module protrudes forward,
   wherein the drive device pushes said at least one lateral end of the display module forward such that said at least one lateral end of the display module protrude forward, and
   wherein the drive device includes at least one motor to generate torque, a plurality of pinions to be rotated by the at least one motor, a pair of racks tooth-engaged with the plurality of pinions so as to be moved in opposite directions via rotation of the plurality of pinions, and a pair of rotating members each having one end rotatably fastened to a corresponding one of the racks and the other end rotatably fastened to one corresponding lateral end of the display module.

2. The display apparatus according to claim 1, wherein the display module includes a display panel and a support frame to support the display panel, and wherein the display panel and the support frame are formed of deformable materials.

3. The display apparatus according to claim 2, wherein the display panel includes an organic light emitting diode panel.

4. The display apparatus according to claim 1, further comprising a guide plate to which the drive device is installed, the guide plate movably supporting the racks.

5. The display apparatus according to claim 4, wherein the racks include a first rack horizontally movably coupled to one side of the guide plate and a second rack horizontally movably coupled to another side of the guide plate, the first rack and the second rack being moved in opposite directions, wherein the plurality of pinions include a pair of first pinions tooth-engaged with the first rack, and a pair of second pinions tooth-engaged with the second rack, and wherein the at least one motor includes at least two first motors to rotate the respective first pinions, and at least two second motors to rotate the respective second pinions.

* * * * *